Nov. 25, 1941. J. R. HOLMES 2,264,027
DIRECTION SIGNAL
Filed Jan. 7, 1939 2 Sheets-Sheet 1

INVENTOR
BY John R. Holmes.
Harness, Lind, Patee & Harris
ATTORNEYS.

Nov. 25, 1941. J. R. HOLMES 2,264,027
DIRECTION SIGNAL
Filed Jan. 7, 1939 2 Sheets—Sheet 2
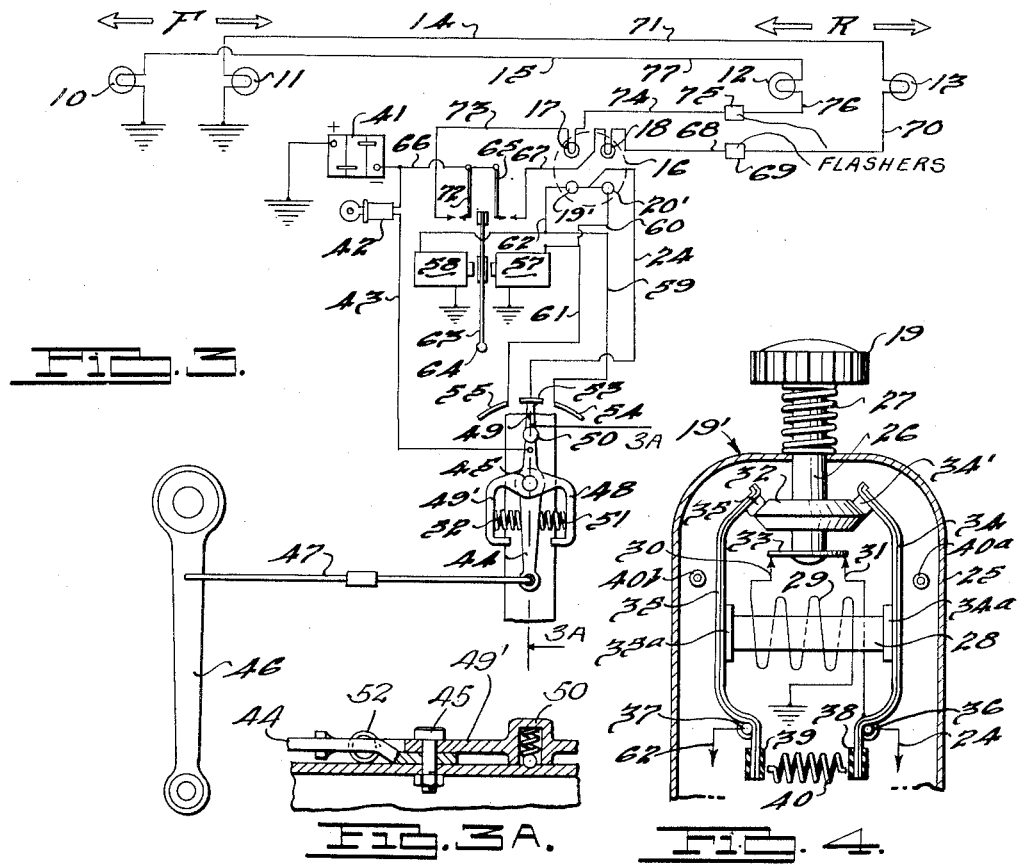
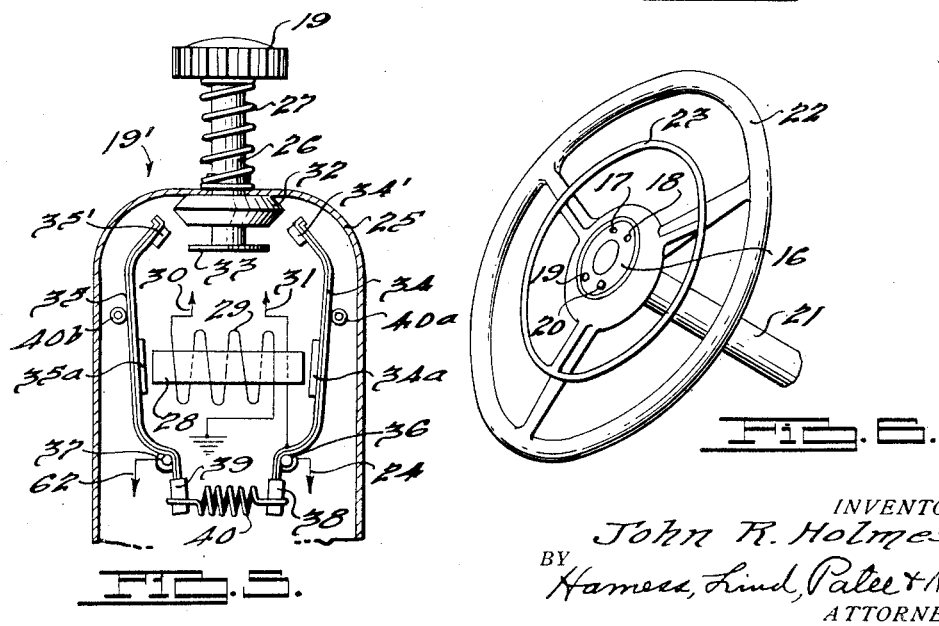
INVENTOR
John R. Holmes.
BY Harness, Lind, Palee & Harris
ATTORNEYS.

Patented Nov. 25, 1941

2,264,027

UNITED STATES PATENT OFFICE 2,264,027

DIRECTION SIGNAL

John R. Holmes, Highland Park, Mich., assignor to Chrysler Corporation, Highland Park, Mich., a corporation of Delaware Application January 7, 1939, Serial No. 249,738

3 Claims. (Cl. 200—88)

This invention relates to direction signals.

It relates particularly to a direction signal for an automotive vehicle of the type wherein an indicating device such as an arrow positioned on the front and/or rear of the vehicle may be illuminated to show drivers in other cars that a turn is contemplated.

It is the main object of the invention to provide such a signalling device which is easy and convenient in its operation and which requires a minimum of attention on the part of the driver.

Another object of the invention is to provide a direction signal which will give positive information to the driver regarding the signal being given as well as to whether the system is operating or not.

Another object of the invention is to provide a direction signal which will automatically release itself after the contemplated turn has been made.

An additional object is to provide such a signal which will automatically release itself after a predetermined period of time if the contemplated turn is not made.

Still another object of the invention is to provide such a signal which will be automatically operable to signal a turn when the vehicle driver forgets or neglects to manually place such signal in operation.

Other objects will be obvious from a reading of the following specification in connection with the accompanying drawings, in which:

Fig. 3 is a wiring diagram of the electrical circuit.

Fig. 3A is a section along the line 3A—3A of Fig. 3.

Fig. 4 is a diagrammatic view of the signal control switch in closed position.

Fig. 5 is a view similar to Fig. 4 but showing the switch in open position.

Fig. 6 is a view of a vehicle steering wheel showing the control panel for the direction signal.

Figure 1:
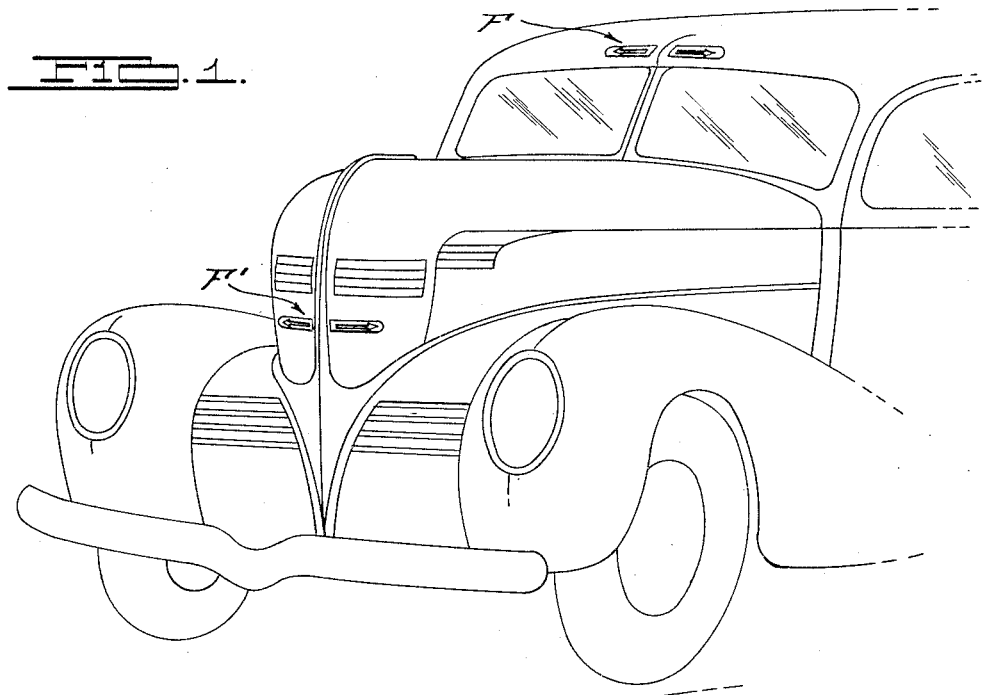
Fig. 1 is a front view of an automobile showing two possible locations of direction indicating arrows.

Referring to the drawings in which like numerals of reference designate like parts referred to in the following description, Fig. 1 shows the forward position of a motor vehicle having a direction signal F mounted in the roof panel, just above the windshield. A second direction signal F' mounted in the hood panel at the front thereof is a duplicate of F and is intended to be operated simultaneously therewith. Both signals comprise a right and left indicating arrow so arranged that they can be easily seen from in front of the vehicle. A light source (not shown) is provided in the rear of each arrow and it is intended that a control mechanism, such as that about to be described herein, will be provided to control said light source in such manner that the driver of the vehicle may indicate the direction of a contemplated turn by illuminating the proper arrow so that the drivers of other vehicles approaching from the front may be warned.

Figure 2:
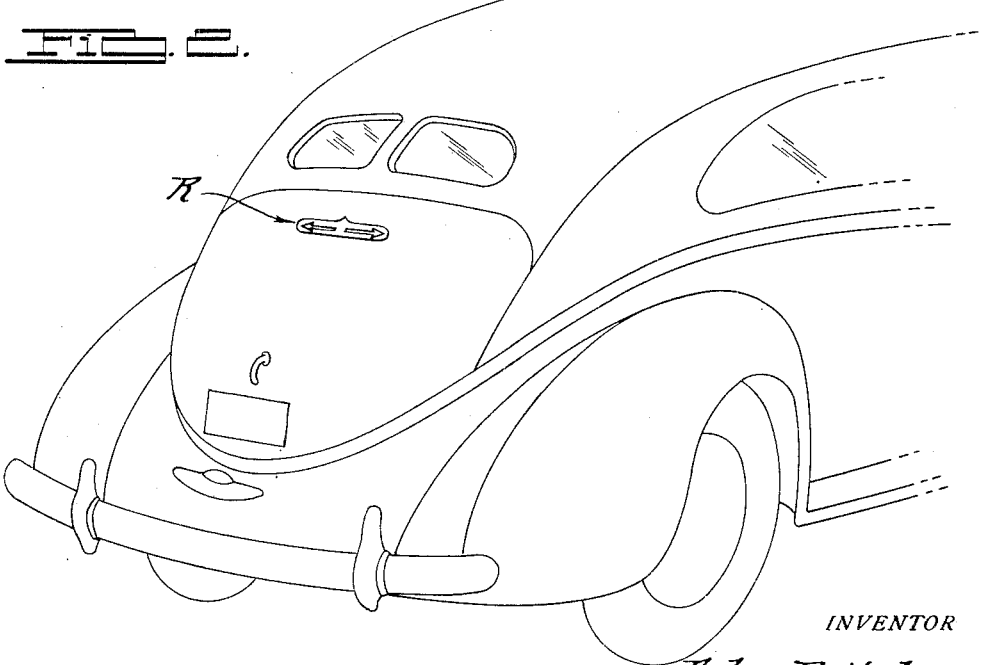
Fig. 2 is a rear view of an automobile showing one possible location of direction indicating arrows.

Fig. 2 shows the rear portion of the vehicle with a signal R similar to F and F' mounted in the luggage compartment door so as to be visible from the rear of the car. It is of course obvious that other locations on the vehicle may be chosen for the direction indicating arrows, the positions shown being the preferred ones. While two pairs of arrows have been shown on the front of the vehicle and one pair on the rear thereof, with the control mechanism about to be described, any number of signals may be operated simultaneously. For the sake of clarity, the wiring diagram of Fig. 3 provides for the use of two signals only, a front signal F and a rear signal R.

The reference numerals 10 and 11 designate respectively the electric lamps positioned in the rear of the left and right indicating arrows of the signal F, and the numerals 12 and 13 designate respectively the lamps for illuminating the left and right arrows of signal R. If only one set of arrows is provided on the vehicle, the wires 14 and 15 may lead directly to ground. Additional sets of lamps may of course be connected in series (or in parallel) with the lamps 10 and 12 and 11 and 13 to illuminate additional signal arrows if desired.

A control panel 16 is provided at the top of the vehicle steering column 21 which is provided with the usual hand wheel 22 and horn control ring 23. On this panel are positioned left and right finger control buttons 19 and 20 respectively and left and right indicating lights 17 and 18 respectively. Control buttons 19 and 20 control the operation of a pair of identical thermo-electro-magnetic switches which will be described in detail below. The indicating lights 17 and 18 are connected in series with the lamps positioned in rear of the signal arrows F and R, as may be seen from the wiring diagram in Fig. 3, and indicate to the vehicle driver whether or not the proper arrow is illuminated, as well as whether or not the signal system is operating.

The finger operated control buttons 19 and 20 are each operatively related to a pair of novel switches designated 19' and 20' respectively, one of which is shown in Figs. 4 and 5 of the drawings. These switches are positioned at the top of the column 21 beneath the control panel 16. Because they are identical, a description of one will be sufficient to make the operation clear. The switch 19' controlled by the button 19 consists of a housing 25 in which is mounted an electro-magnet having a core 28 and a field coil 29. One side of the field coil is connected to the switch contact 30 while the other side is grounded, as is indicated diagrammatically in Figs. 4 and 5. The button 19 is mounted on a pin 26 of suitable insulating material such as hard rubber, synthetic resin or the like which is adapted to slide vertically through a hole in the top of the casing 25. A spring 27 urges the button 19 and the pin 26 upwardly to the normally non-operative position shown in Fig. 5.

The pin 26 carries a pair of current conducting annular rings 32 and 33, the latter of which is adapted to contact the switch points 30 and 31, as shown in Fig. 4. A pair of bi-metallic arms 34 and 35 are pivoted to the housing 25 at 36 and 37 respectively, and are provided at their lower ends with insulating portions 38 and 39 respectively between which is connected a tension spring 40, the function of which is to urge the arms 34 and 35 to their open position against the insulated stops 40ª and 40ᵇ shown in Fig. 5.

The pivot pin 36 for the arm 34 is connected through line 24 to the negative side of the vehicle battery 41 and the pivot pin 37 for the arm 35 is connected through line 62 to the field coil of an electro-magnet as will presently be explained.

Referring to Fig. 3, it will be seen that the negative side of the battery 41 is connected to the line 43 through the vehicle ignition switch 42. Line 43 is connected to an arm 48 pivoted to the vehicle frame at 45 and maintained in a normal central position by a detent 50, which may be of any well known construction such as, for example, a spring-urged ball type, as illustrated in Fig. 3A. The arm 48 has an integral upward extension 49 normally in contact with a contact segment 53 and an integral yoke portion 49', on which a pair of coil springs 51 and 52 are mounted.

A second arm 44 is also pivoted to the frame at 45 and is connected at its lower end with the pitman 46 of the vehicle steering gear through a link 47. Coil springs 51 and 52 allow the arm 44 to have slight movement about the pivot 45 without disturbing the position of the arm 48, but are of such strength that a predetermined amount of compression thereof will overcome the force of the detent 50 and cause arm 48 to snap over into alignment with arm 44, whatever its position.

The upwardly extending portion 49 of arm 48 is adapted to contact with a contact segment 53 which is connected through line 24 to the pivot pin 36 of the switch 19' and to a similar pin in the switch controlled by the button 20. The pivot pin 37 of switch 19' is connected through line 62 to one side of the field of an electro-magnet 58, the other side of which is grounded. The magnet 58 controls the operation of the left-hand direction arrow lamps 10 and 12 and the pilot light 17. A similar magnet 57 is connected to one side of the switch 20' through the line 61 and it controls the right-hand direction arrow lights 11 and 13 and the pilot light 18.

The magnets 57 and 58 directly control the position of a switch actuating arm 63 which is pivoted to a suitable support at 64. When the right hand magnet 57 is energized, the arm 63 is attracted toward the right (as shown in Fig. 3) and the spring arm 65 which is connected through line 66 by the negative side of the battery 41 is pressed into contact with line 67, thereby connecting the negative side of the battery 41 to the pilot light 18 through the lines 66 and 67, to light 13 through line 68, flasher 69 and line 70, then to light 11 through line 71. Similarly, when magnet 58 is energized, the negative side of the battery is connected through switch blade 72 and line 73 to pilot light 17, through line 74, flasher 75 and line 76 to light 12, thence through line 77 to light 11. The flashers 69 and 75 are of any well-known type and may be omitted without affecting the operation of the signal. It has been found, however, that the use of flashers is desirable because of the fact that a flashing signal draws attention more quickly than a non-flashing one.

The magnet 58 may be energized either through line 43, arm 48, segment 53, line 24, switch 19' and line 62, or it may be energized through line 43, arm 48, contact segment 54 and line 59, depending upon the position of arm 48. Similarly, magnet 57 may be energized through line 43, arm 48, line 24, switch 20' and line 60, or it may receive current by way of line 43, arm 48, control segment 55 and line 61, depending upon the position of arm 48. The contact segments 54 and 55 are larger than contact segment 53 and are of such length that portion 49 of arm 48 will be in contact at all times with one or the other of them after arm 48 has been forced out of its central position by one of the springs 51, 52.

The springs 51, 52 are of such force that the arm 44 may have considerable fore and aft movement without disturbing the position of the arm 48. This allows the vehicle driver to correct slight deviations of the vehicle from the straight ahead direction of travel without causing operation of the signal lamps. The amount of turn allowable without causing operation of the signal may be changed by changing the force of springs 51 and 52. It has been found, however, that by allowing arm 44 a movement of 5 degrees on each side of its normal central position before disturbing the position of arm 48, satisfactory operation is obtained.

Returning now to Figs. 4 and 5, it will be seen that the lines 24 and 62 are connected together through the arms 34 and 35, the contact tips 34' and 35' and the ring 32 when the switch 19' is closed. The switch 20' connects lines 24 and 60 in an identical manner when switch 20' is closed.

In describing the operation of the device, let us assume that the vehicle is travelling in a straight ahead direction and the driver thereof decides to make a left turn. The button 19 is pushed downwardly until the contact member 33 contacts the switch points 30 and 31. Immediately the field coil 29 of the magnet is energized through line 43, arm 48, segment 53 and line 24, thereby causing the core 28 to attract the armatures 34ª and 35ª whereupon the arms 34 and 35 are brought together with the respective contact tips 34' and 35' in contact with the upper beveled surface of the ring 32. The vehicle driver may then remove his finger from the button 19 and the switch 19' will remain in this condition (shown in Fig. 4) because of the fact that the pin 26 cannot move upwardly under the influence of spring 27 while the ring 32 is firmly held against movement by the arms 34 and 35. A circuit now has been established through arm 34, ring 32 and arm 35 of the switch connecting line 24 with line 62 thereby energizing magnet 58 and effecting a connection of the lines 66 and 73 through the switch 72 whereupon lamps 17, 12 and 10 are "on."

If the driver then turns toward the left, the pitman 46 will act through the link 47, arm 44 and spring 52 to snap over arm 48 (after 5 degrees of travel of arm 44) so that the upper extension 49 thereof will break contact with segment 53 and establish a new contact with segment 54.

Immediately upon the breaking of the contact between arm 48 and segment 53, the connection between line 24 and the battery 41 will be broken, thereby deenergizing magnet 28 and allowing the upper portions of arms 34 and 35 to move away from each other under the influence of the spring 40. Spring 27 will then return the pin 26 and button 19 to inoperative position (shown in Fig. 5) without attention on the part of the vehicle operator. At the same time a new circuit to magnet 58 is established by way of segment 54 and lines 59 and 60, thereby keeping lamps 17, 12 and 10 lighted. After the turn is completed, return of the pitman 46 to its normal central position causes arm 48 to be snapped back to its normal central position by the spring 52 and the upper extension 49 will then be moved into contact with segment 53 which is dead and the signal lamps will be extinguished.

Should the driver of the vehicle make a left turn without first depressing the button 19, signal lamps 10, 12 and 17 will be lighted as soon as the vehicle starts into the turn or in other words, as soon as the extension 49 of arm 48 contacts segment 54 after 5 degrees of travel of arm 44.

Should the driver signal for a left turn by depressing switch button 19 and then make a right turn, left hand lamps 10, 12 and 17 will be extinguished as soon as the extension 49 leaves contact with segment 53, due to the breaking of the circuit through switch 19 and right hand lamps 11, 13 and 18 will be lighted when extension 49 contacts segment 55, thereby establishing a circuit from battery 41 through line 43, arm 48, segment 55 and line 61 to magnet 57 which controls the right hand signal.

If the driver of the vehicle should continue straight ahead after signalling for a left or right turn, the signal will automatically release itself after a predetermined period of time. This action is accomplished in the following manner. As set forth above, the arms 34 and 35 of the switches 19 and 20 are of bi-metal construction, consequently the current from line 24 causes heating in the arms and if the current is allowed to remain on long enough, the arms will be bent oppositely to one another by bi-metallic action and the ring 32 will be released, thereby breaking the circuit between contacts 30 and 31 and deenergizing the magnet 28.

The features just discussed have been described with relation to the switch 19' which controls the left-hand signal, but it is of course obvious that the switch 20' is intended to operate in an identical manner to control the right-hand signal.

The above description is directed to but one of the many modifications of which the improved signal device is susceptible. It is intended to be illustrative only and it is not desired to limit the spirit or scope of the invention except as defined in the following claims.

I claim:

1. In a direction signal apparatus for vehicles, a switch having a casing, a pair of spaced current conducting arms pivoted to said casing, a plunger having a conducting portion adapted to be moved into position between said arms, and magnetic means for moving said arms into contact with said conducting portion when said plunger is depressed and for retaining said plunger in depressed condition.

2. In combination with a vehicle direction signal, a switch having a casing, a pair of spaced current conducting arms pivoted to said casing, a plunger having a conducting portion adapted to be moved into position between said arms, magnetic means for moving said arms into contact with said conducting portion when said plunger is depressed, and means for energizing said magnetic means upon depression of said plunger.

3. In a direction signal apparatus, in combination, a switch having a casing, a pair of bimetallic spaced current conducting arms pivoted to said casing, a plunger having a conducting portion adapted to be moved into position between said arms, and means for moving said arms into contact with said conducting portion when said plunger is depressed whereby a circuit is established through said arms and said plunger is held in depressed position by said arms.

JOHN R. HOLMES.